March 15, 1949.  R. A. MacGREGOR  2,464,326
SHOCK ABSORBER
Filed June 13, 1947
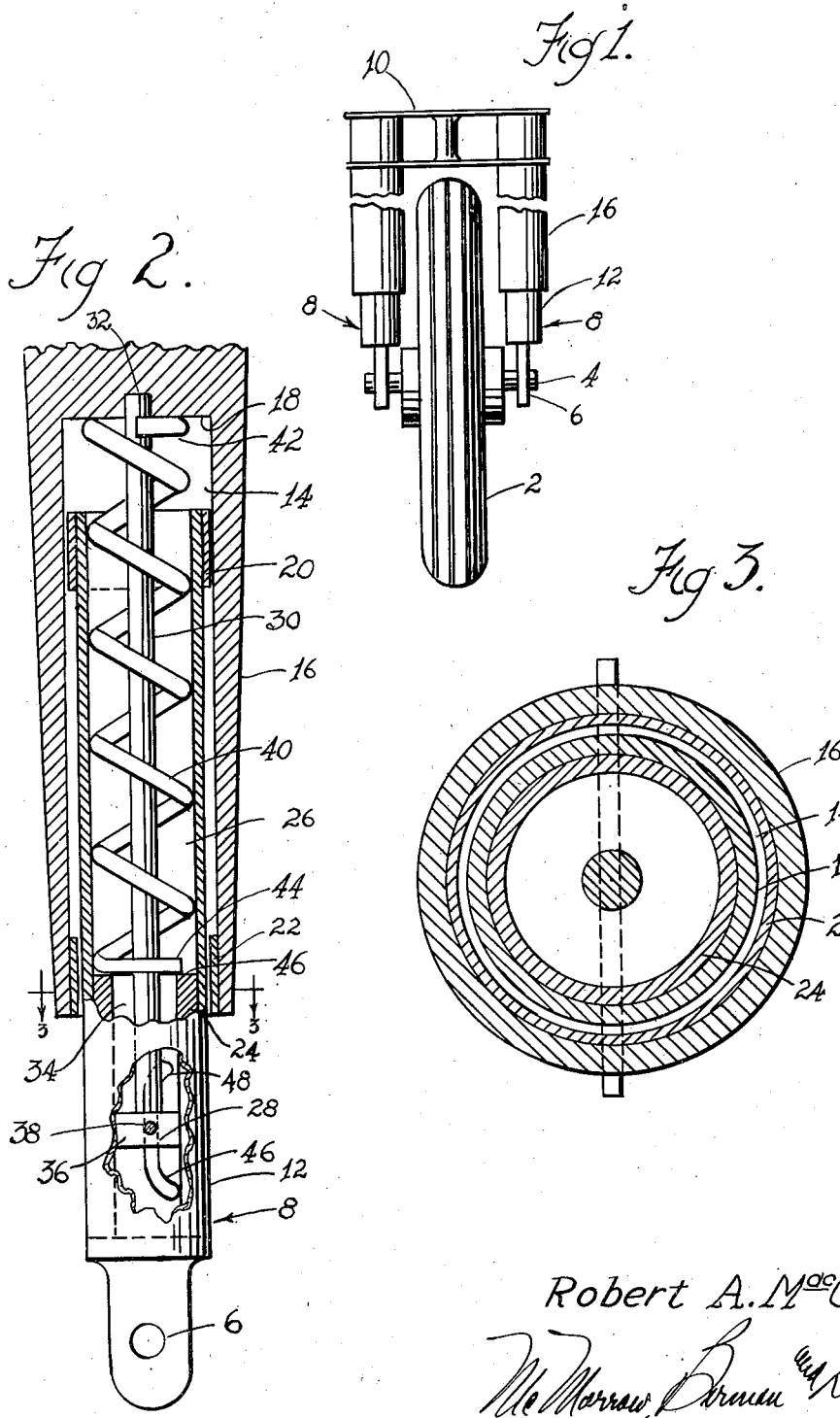
Inventor
Robert A. MacGregor
Attorneys Patented Mar. 15, 1949

2,464,326

UNITED STATES PATENT OFFICE 2,464,326

SHOCK ABSORBER

Robert A. MacGregor, Olney, Ill.

Application June 13, 1947, Serial No. 754,345

2 Claims. (Cl. 280—276)

This invention relates to shock absorbers and similar devices for absorbing and dampening out vibration.

An object of the invention is to provide a means for dampening out shocks by employing them to torsionally stress a resilient shock absorbing member.

Another object of this invention is to provide a new improved type of shock absorber which is particularly advantageous in absorbing the hard road shocks encountered in motorcycle operation by means of a helically sprung, torsionally dampened telescopic front fork.

A further object of this invention is to provide a novel improved type of motorcycle shock absorber which is simple and positive in operation, and is easy and inexpensive to manufacture.

Other objects and advantages of my invention will become apparent from the following description of a preferred embodiment thereof as illustrated in the accompanying drawing, and in which:

Figure 1 is a front elevation of a motorcycle front fork and wheel, employing my invention.

Figure 2 is a sectional side elevation of one leg of the front fork shown in Figure 1, and Figure 3 is a cross sectional view taken on line 3—3 of Figure 2.

Referring to the drawing, in which like numbers are employed to designate like parts through the several views, it will be observed that there is a wheel 2 mounted for rotation about a horizontal axis on axle 4 supported in bearings 6 at the lower ends of legs 8 which are connected above the wheel by bridging member 10 which, with the two legs 8 forms the front fork commonly used on vehicles like motorcycles. The fork is surmounted by handle bars, not shown, and pivotally supports the front end of a motorcycle frame, not shown, in a manner well known in the art.

Each leg 8 of the fork includes a lower tube 12 telescoping within a bore 14 in upper tube 16, the bore 14 being closed at its upper end 18 and open at its lower end to allow the lower tube 12 to slide therein. As shown, there is some clearance between the outside surface of the lower tube 12 and the inner surface of the bore 14, the lower tube carrying secured to its outer surface a spacing member 20 at its upper end, and the upper tube carrying a spacer member 22 secured to its inner surface.

A hardened steel cylindrical drum 24 is secured within the lower end of bore 26 in lower tube 12 in any suitable manner so as to prevent its turning or moving therein. The drum 24 is provided with a cam slot 28 curved as shown into a shape somewhat like a crescent. A torsion rod 30 is rigidly secured at its upper end 32 to the upper end wall 18 of bore 14, the rod 30 extending downward axially through the bores 14 and 26 and into the bores 34 in steel drum 24. The rod 30 is enlarged at its lower end to form a cylindrical piston fitting slidably in bore 34. The piston 36 carries a radially projecting cam slot follower stud 38 in the form of a pin as shown, the pin projecting into the cam slot 28.

A helical compression spring 40 is disposed in the bores 14 and 26, with its upper end 42 bearing against the upper wall 18 of the bore 14, and with its lower end 44 bearing against and seated on the upper edge 46 of steel drum 24. The entire unit described operates preferably in an oil bath.

It will be observed that the greater portion of slot 28 is merely vertical, so that as the motorcycle encounters ordinary or relatively mild shocks, the helical spring 40 functions to absorb the shocks. However, when violent shocks are encountered, they will cause the telescoping parts to undergo greater relative movement, so that, as the lower tube 12 moves upwards, the pin 38 in the slot 28 will have reached the lower curved portion 46 of the slot, thus the pin 38 will be cammed to the right as seen in the view, and causing the rod 30 to be twisted or torsionally stressed, and thus the shock is absorbed and converted into the work of twisting the rod 30. Similarly, when the lower tube 12 moves sharply downward relative to upper tube 16, the pin 38 is cammed over to the right by the upper curved portion 48 of the slot 28, thus causing the force of the shock to be converted into energy of twisting the rod 30. The helical spring 40 should be of such length and stiffness as to carry only the lighter types of shocks, the torsion rod 30 being suitably dimensioned to take care of the heavy shocks. The cam slot 28 is so formed as to dampen extreme motion of lower tube 12 either up or down, and to prevent or "snub" rebound.

This novel type of fork has the advantages of simplicity of construction and assembly, and in addition it is important to note that the damping action is not dependent upon or appreciably affected by temperature changes as is the usual situation when using oil damped action.

Although I have described a preferred embodiment of my invention in specific terms, it is to be understood that various changes may be made in size, shape, materials and arrangement without departing from the spirit and scope of the invention as claimed.

I claim:

1. A shock absorber comprising a plurality of housings having downwardly open recesses and joined at their upper ends to form a motorcycle front fork, shock receiving members telescopically slidably disposed in said recesses, said members having bearings in their lower ends for the reception of an axle with rotatable wheel thereon, said shock receiving members having cam slots in their sides and upwardly open recesses in their upper end portions coaxial with said downwardly open recesses, a compression spring within said recesses for absorbing shocks, and a torsion spring in said recesses engaging said housing at its upper end and having at its lower end a pin extending into said cam slot, said cam slot being so shaped that it is ineffective to stress the torsion spring during initial telescoping movement but after a predetermined amount of telescoping movement becomes effective to stress said torsion spring for absorbing heavy shocks.

2. A shock absorber including a downwardly-directed housing having a downwardly-open cylindrical recess, a shock-receiving member telescopingly-extending slidably upward into the recess in the housing and having an upwardly-open recess therein coaxial with the first-mentioned recess, a compression spring disposed in the two recesses resiliently bearing against the inner portions of the latter in the housing and the shock-receiving member for absorbing shocks, the shock-absorbing member having a cam slot in the side thereof, and a torsion spring in said recesses engaging said housing at its upper end and having at its lower end a transverse pin extending into said cam slot, said cam slot being so shaped that it is ineffective to stress the torsion spring during initial telescoping movement but after a predetermined amount of telescoping movement becomes effective to stress said torsion spring for absorbing heavy shocks.

ROBERT A. MacGREGOR.

REFERENCES CITED

The following references are of record in the file of this patent:

UNITED STATES PATENTS

| Number | Name | Date |
|---|---|---|
| 670,320 | Janney | Mar. 19, 1901 |
| 706,306 | Ewart | Aug. 5, 1902 |
| 940,245 | Gates | Nov. 16, 1909 |
| 1,894,717 | Sproul | Jan. 17, 1933 |
| 2,000,905 | Rockefeller | May 14, 1935 |
| 2,193,881 | Peglow | Mar. 19, 1940 |
| 2,428,148 | Dawson | Sept. 30, 1947 |

FOREIGN PATENTS

| Number | Country | Date |
|---|---|---|
| 144,097 | Austria | Dec. 27, 1935 |